3,050,537
ORGANO-BIMETALLIC COMPOSITIONS
Richard D. Gorsich, Baton Rouge, La., assignor to Ethyl Corporation, New York, N.Y., a corporation of Delaware
No Drawing. Filed Aug. 5, 1960, Ser. No. 47,603
20 Claims. (Cl. 260—429)

This invention relates to and has as its principal objects the provision of novel organo-bimetallic compounds wherein the metals are selected from group IV–A and group VII–B of the periodic system, respectively; the provision of novel methods for the preparation of such compounds; and the provision of the use thereof as antiknock agents in motor fuels and for other purposes.

The compositions of this invention are organo-bimetallic compounds of the general formula $$R_nM^4[M^7(CO)_5]_{4-n}$$

In this formula R is a hydrocarbon group, preferably an alkyl, aryl, cycloalkyl, aralkyl or alkaryl radical containing from 1 to about 18 carbon atoms, $M^4$ is an element of group IV–A of the periodic system having an atomic number from 14 to 82, inclusive, i.e., silicon, germanium, tin or lead, $M^7$ is an element of group VII–B of the periodic system having an atomic number from 25 to 75, inclusive, i.e., manganese, technetium or rhenium, and $n$ is 2 or 3.

Where the term "periodic system" is used herein, reference is made to the Periodic Chart of the Elements, copyright 1957 and revised 1958 by the Fisher Scientific Company, Chicago, Illinois.

The compositions of this invention are in general liquid or low-melting solid compounds which are stable at ordinary temperatures and which can readily be prepared and stored without special precautions for future use. The lead compounds melt in general at lower temperatures than the corresponding tin compounds and the melting point tends to increase with the number and molecular weights of the organic substituents designated above as R.

These compounds vary in color from white through yellow to orange. The depth of color tends to increase with the atomic weight of the group IV–A metal and with the number of the group VII–B metal pentacarbonyl groups in the molecule. Thus, triphenyltin manganese pentacarbonyl is white in color whereas the corresponding lead compound is yellow and, when one passes from trimethyllead manganese pentacarbonyl to dimethyllead bis(manganese pentacarbonyl), the color deepens from yellow to orange.

The compounds of this invention, in general, are soluble in organic solvents such as aliphatic and aromatic hydrocarbons, e.g., n-hexane, petroleum naptha and benzene, in alcohols such as ethanol and hexanol, in halohydrocarbons such as methylene dichloride and carbon tetrachloride and in ethers such as diethylether, methylethylether and tetrahydrofuran.

Of the metals represented by $M^7$ in the above formula, manganese is preferred for several reasons. It is easier to procure than the other metals of this group and is available in far larger quantities. As a direct result of its availability it is also far cheaper than the other metals. Consequently, the manganese compounds of the invention are more adapted for preparation on a larger scale, thereby taking advantage of the economies normally associated with large-scale operations.

The novel compounds of this invention are of considerable value in the chemical and allied arts. For example, the manganese compounds are potent antiknock agents, and in this utility they are versatile agents in that they are highly effective in both unleaded and conventional leaded gasolines made from a wide variety of base stocks. Of the various compounds encompassed by this invention, those containing both lead and manganese are preferred as antidetonants because of the powerful antiknock effects produced thereby. The most outstanding antiknocks are the dialkyllead bismanganese pentacarbonyls and the trialkyllead manganese pentacarbonyls, especially those compounds in which the alkyl groups are methyl or ethyl or a combination of these. In fact, many of these compounds are even more effective antidetonants than manganese pentacarbonyl, the very great effectiveness of which is reported in U.S. Patent No. 2,913,413.

Triethyllead manganese pentacarbonyl constitutes an exceptionally outstanding embodiment of this invention. Not only is this compound an unusually effective antidetonant, but it is a liquid at ordinary temperatures, which, among other things, greatly facilitates its measurement and its blending with fuels and lubricants.

Accordingly, another embodiment of this invention relates to the provision of gasoline fuel compositions containing the novel bimetallic compounds of this invention. Thus, in one form, the invention involves a liquid hydrocarbon fuel adapted for operating spark ignition internal combustion engines containing, in an amount sufficient to increase the antiknock rating thereof, a compound of the above formula wherein $M^7$ is manganese. Further embodiment of the invention are liquid hydrocarbon fuels of the gasoline boiling range containing an antiknock-increasing amount of a trialkyllead manganese pentacarbonyl or a dialkyllead bis(manganese pentacarbonyl), or a mixture of these.

That the compounds of this invention are highly versatile is shown by the fact that their use as antiknock additives not only involves clear—i.e., unleaded—fuels but includes leaded fuels as well, that is, fuels containing a previously-known alkyllead antiknock compound such as tetraethyllead, or containing a mixture of such alkyllead compounds. Thus, another embodiment of the invention is a liquid hydrocarbon fuel for Otto-cycle engines containing both a tetraalkyllead compound and an antiknock-increasing amount of a manganese-containing compound of this invention. In this embodiment, best results occur when the concentration of the tetraalkyllead compound is equivalent to from about 0.5 to about 6.0 grams of lead per gallon and the concentration of the manganese compound is equivalent to from about 0.005 to about 2 grams of manganese per gallon.

The preferred antiknock fuels of the invention (because of their economy and availability) are leaded or unleaded gasolines containing a compound of the formula $$R_nM^4[Mn(CO)_5]_{4-n}$$

wherein $M^4$ is tin or lead, R is a lower alkyl group, e.g., methyl, ethyl, pentyl, etc., or is an aryl group having up to 8 carbon atoms, e.g., phenyl, tolyl, xylyl, etc., and $n$ is 1 or 2.

In addition to their effectiveness as antiknock agents for hydrocarbon fuels, the compounds of this invention are excellent lubricant additives. In this application, as well as in fuels, they exhibit unusual versatility. Thus, when dissolved in lubricants, they effectively improve the lubricating properties thereof, greatly reduce engine wear, virtually eliminate frictional damage and/or bring about improvements in stability. Their versatility is further attested to by the wide variety of natural and synthetic lubricant bases in which they produce the above effects. For example, they are highly effective for the above and other purposes in such lubricating and industrial oils as crankcase lubricating oils, transformer oils, turbine oils, transmission fluids, cutting oils, glass annealing oils, gear oils, mineral white oils, oils thickened with soaps and inorganic thickening agents, hydraulic fluids and, in general, engine and industrial oils which are derived from crude petroleum or produced synthetically.

Typical of the synthetic lubricants are the polybutene oils, the ester oils, the silicone oils, phosphates, phosphonates, and the like. The ester oils include such compounds as di-2-ethylhexyl sebacate, di-sec-amyl sebacate, di-2-ethylhexyl azelate, di-3-methylbutyl adipate, di-2-ethylhexyl adipate, di-isooctyl adipate, di-2-ethylhexyl phthalate, di-butoxyethyl phthalate, pentaerythritol tetracaproate, triethyleneglycol di-2-ethylhexanoate and polyethyleneglycol di-2-ethylhexanoate. Examples of the silicone oils are the dimethyl, divinyl, diphenyl, methylvinyl, methylphenyl, diethyl, dibutyl, di-p-bromophenyl, di-p-chlorophenyl, di-p-fluorophenyl, di-m-trifluoromethylphenyl, di-p-phenoxyphenyl, di-m-chlorophenyl, di-3,4-dichlorophenyl, di-3-chloro-4-bromophenyl, di-p-methoxyphenyl and di-p-cyanophenyl, siloxanes, i.e., silicone derivatives.

Among the most effective compounds of this invention as lubricant additives are those containing manganese bonded to lead and, particularly, to tin. Thus, these are the preferred lubricant additives for use in accordance with this invention.

Therefore, another embodiment of this invention is a lubricating oil containing a small amount, sufficient to improve the lubricating properties thereof, of a compound of this invention wherein $M^7$ is manganese and $M^4$ is lead or tin. In another form, this invention involves a liquid hydrocarbon lubricant containing a lubricity-improving amount of a dialkyltin bis(manganese pentacarbonyl) or a trialkyltin manganese pentacarbonyl, or a mixture of these.

An excellent feature of these lubricant additives is that they can be used not only in a wide variety of oils but also in combination with other additives without in any way impairing their effectiveness or that of the other additives. Such additives include, for example, antioxidants, metal deactivators, detergent-dispersants, pour point depressants, viscosity index improvers, antifoam agents, corrosion inhibitors, oiliness or film-strength agents, dyes and the like.

The preferred lubricants of the invention are the cheap and readily available liquid hydrocarbon crankcase lubricating oils containing from about 0.05 to about 5.0 weight percent of manganese as a compound of the formula $$R_nM^4[Mn(CO)_5]_{4-n}$$

wherein $M^4$ is tin or lead, R is a lower alkyl group, e.g., methyl, ethyl, pentyl, etc., or is an aryl group having up to about 8 carbon atoms, e.g., phenyl, tolyl, xylyl, etc., and $n$ is 1 or 2.

In addition to the foregoing uses, the compounds of this invention find application as plasticizers and stabilizers for vinyl and other synthetic resins, such as polyvinyl chloride.

The compounds of this invention are best prepared by reacting an alkali metal derivative of a carbonyl of a metal of group VII–B of the periodic system (manganese, technetium or rhenium) with an organo metal halide of a metal of group IV–A of the periodic system (silicon, germanium, tin or lead). In this reaction the alkali metal of the carbonyl reactant is replaced by the organometallic radical of the halide reactant. The group VII–B reactants used in this process are preferably alkali metal carbonyl compounds of manganese, technetium or rhenium having the formula $$M^1[M^7(CO)_5]$$

wherein $M^1$ is lithium, sodium, potassium, rubidium or cesium—i.e., a group I–A element having an atomic number of 3 through 55, inclusive (Periodic Chart of the Elements, Fisher Scientific Company, New York, 1957), and $M^7$ is manganese, technetium or rhenium. Of the group I–A metals, sodium and potassium are preferred because of their availability and economy and, of the group VII–B metals (i.e., $M^7$), manganese is preferred for the reasons noted above.

The halide reactants are di- or triorgano halide compounds having the formula $$R_mM^4X_{4-m}$$

wherein $M^4$ is silicon, germanium, tin or lead, i.e., an element of group IV–A of the periodic system having an atomic number from 14 to 82, inclusive; X is halogen; $m$ is 1 or 2; and R is an alkyl, cycloalkyl, aryl, aralkyl or alkaryl radical; and wherein the several R groups can be the same or different. Generally speaking, each of the R radicals contains up to about 18 carbon atoms. Of the halogens, chlorine is preferred, because the organic chlorides of $M^4$ are generally more stable and more soluble in organic solvents than the bromides and iodides, and are more reactive than the fluorides. Further, chlorine is the cheapest of the halogens, and therefore the organic $M^4$ chlorides are more economical to prepare than any of the other halides. In this process $M^4$ is preferably tin or lead since the reaction proceeds very smoothly giving good yields of especially valuable products.

In general, the halide groups of the halogen reactant are completely replaced by the manganese pentacarbonyl groups of the manganese reactant, one manganese pentacarbonyl group being present in the formula of the product for each halogen atom originally present in the halogen reactants. The reaction product may on occasion be a mixture of mono- and di-substitution products which can readily be separated by solvent extraction, fractionation, or other appropriate means.

The reaction of this invention is normally carried out in an inert organic solvent. Ethers are generally preferred because of their solvent power for the reactants and tetrahydrofuran is particularly preferred because of the ready solubility of the reactants therein, its volatility and consequent ease of separation from the reaction products, and the ease with which the solvent may be made and kept anhydrous.

The reaction of this invention proceeds smoothly and rapidly even at room temperature, reaching completion for the lower alkyl derivatives in 15 minutes to a half hour. Somewhat longer reaction times are desirable for the higher alkyl derivatives. The reaction temperature can vary from below room temperature to the normal reflux temperature of the solvent or even higher if pressure is employed. However, elevated temperatures should be used with care since prolonged heating at reflux may cause decomposition of the reaction product. The pressure employed may range from 10 mm. of mercury or less to 100 atmospheres or more but, in general, normal atmospheric pressure is wholly satisfactory.

The invention will be more fully understood by reference to the following set of illustrative examples in which all parts and percentages are by weight.

EXAMPLE I

A tetrahydrofuran solution of sodium manganese pentacarbonyl was prepared from 19.5 grams (0.05 mole) of manganese pentacarbonyl dimer and sodium amalgam (5 grams of sodium and 500 grams of mercury) in about 300 milliliters of tetrahydrofuran. The reaction mixture was stirred at room temperature for 30 minutes, after which the mercury was separated. Subsequently 38.0 grams (0.096 mole) of triphenyltin chloride was added and the reaction mixture was then reduced to about half volume by distillation. The mixture was poured into ice water and the solid was filtered off. The solid was dried and extracted several times with n-hexane at reflux. The combined extracts were concentrated to about 70 milliliters. On cooling, white crystals were formed which were filtered off and dried at room temperature under reduced pressure to give 44.7 grams (85% yield)

of triphenyltin manganese pentacarbonyl. This product melted at 148 to 150° C.

*Analysis.*—Calculated: C, 50.69%; H, 2.92%. Found: C, 50.90%; H, 2.87%.

EXAMPLE II

To about 300 milliliters of tetrahydrofuran containing 0.1 mole of sodium manganese pentacarbonyl was added, in small portions, 28.8 grams (0.1 mole) of trimethyllead chloride. The reaction mixture was stirred at room temperature for 3 hours, after which the tetrahydrofuran was distilled out under reduced pressure at about 55° C. The residue was extracted several times with petroleum naphtha. Concentration and chilling of the extracts resulted in the deposition of orange crystals which were filtered off and dried to give 7.23 grams (22% based on sodium manganese pentacarbonyl) of dimethyllead bis-(manganese pentacarbonyl) melting at 108 to 110° C.

The solvent was evaporated from the filtrate and the residual oil was distilled at 3 millimeters of mercury pressure to give 20.8 grams (46% based on the sodium manganese pentacarbonyl) of trimethyllead manganese pentacarbonyl boiling under these conditions at 60 to 62° C. The distillate was recrystallized from cold petroleum naphtha to give yellow platelets melting at 30 to 31° C.

*Analysis.* — $(CH_3)_3PbMn(CO)_5$. — Calculated: C, 21.48%; H, 2.03%; Pb, 46.33%. Found: C, 21.35%; H, 1.97%; Pb, 46.42%. $(CH_3)_2Pb[Mn(CO)_5]_2$.—Calculated: C, 22.98%; H, 0.96%; Pb, 33.04%. Found: C, 23.03%; H, 0.99%; Pb, 33.10%.

EXAMPLE III 0.046 mole of sodium manganese pentacarbonyl, prepared as previously described, was dissolved in 110 milliliters of tetrahydrofuran and 4.40 grams of dimethyltin dichloride was added to the solution. The mixture was stirred for a half hour at room temperature and was then concentrated by evaporation; thereupon the concentrate was poured into ice water. The crude solid was filtered off and extracted with refluxing n-hexane to give 10.55 grams (98%) of dimethyltin bis(manganese pentacarbonyl) which melted at 95 to 100° C. Recrystallization from n-hexane gave 9.2 grams (86%) of pale yellow platelets melting at 102 to 104° C.

*Analysis.*—Calculated: C, 26.75%; H, 1.12%. Found: C, 26.86%; H, 1.19%.

EXAMPLE IV

To a stirred solution of 14.1 grams (0.029 mole) of triphenyllead chloride in about 40 milliliters of tetrahydrofuran was added, during 5 minutes, 81 milliliters of a tetrahydrofuran solution containing 0.034 mole of sodium manganese pentacarbonyl. The mixture was stirred at room temperature for 1 hour and the solvent was then evaporated under reduced pressure (water aspirator) at 55° C. The residue was extracted 8 times with refluxing n-hexane. The extracts were combined, filtered and concentrated until the product began to crystallize out. After cooling to room temperature, the crystalline product was filtered off and dried in vacuo to give 14.9 grams (82%) of triphenyllead manganese pentacarbonyl, melting at 145 to 148° C. Recrystallization from n-hexane afforded yellow platelets, melting at 146 to 148° C.

*Analysis.*—Calculated: C, 43.60%; H, 2.39%. Found: C, 44.25%; H, 2.59%.

EXAMPLE V

To a stirred solution of sodium manganese pentacarbonyl [prepared from 9.75 grams (0.025 mole) of manganese pentacarbonyl dimer, 200 milliliters of tetrahydrofuran and sodium amalgam (2.5 grams of sodium and 250 grams of mercury)] was added 8.4 grams (0.025 mole) of diethyllead dichloride in small portions during a 15-minute period. The orange reaction mixture was stirred at room temperature for 2.5 hours after which the solvent was evaporated in vacuo (water aspirator). The residue was extracted several times with hot n-hexane. The combined extracts were filtered hot and concentrated until crystals began to separate out. After cooling with an ice bath, the orange crystals were filtered off and dried in vacuo (0.2 millimeter) to give 10.74 grams (66%) of diethyllead bis(manganese pentacarbonyl), melting at 77 to 79° C.

*Analysis.*—Calculated: C, 25.66%; H, 1.54%. Found: C, 25.81%; H, 1.61%.

EXAMPLE VI

To a stirred tetrahydrofuran solution (75 milliliters) containing 0.06 mole of sodium manganese pentacarbonyl was added 16.6 grams (0.05 mole) of triethyllead chloride in about 80 milliliters of freshly distilled tetrahydrofuran during 20 minutes while maintaining a nitrogen atmosphere. The mixture was stirred at room temperature for 1 hour and then briefly heated to reflux. The solvent was evaporated in vacuo and the residue was extracted with petroleum naphtha (boiling point 30 to 60° C.). Following distillation of the solvent from the extracts, the orange residue was distilled under reduced pressure to give 0.75 gram of a fore-run boiling up to 70° C. (0.2 millimeter) followed by 18.42 grams (76%) of triethyllead manganese pentacarbonyl, boiling at 70 to 75° C. (0.16 millimeter) which was a yellow liquid. The sample was redistilled for analytical purposes.

*Analysis.*—Calculated: C, 27.00%; H, 3.09%. Found: C, 27.48%; H, 3.19%.

EXAMPLE VII

Diphenyltin dichloride, 13.5 grams (0.039 mole) and sodium manganese pentacarbonyl, 8.72 grams (0.04 mole), in 190 milliliters of tetrahydrofuran, were allowed to react in the manner previously described. The crude product was extracted with methylene chloride to give 23.22 grams of product, melting at 127 to 130° C. The product was crystallized from n-hexane to give 21.33 grams (82%) of diphenyltin bis(manganese pentacarbonyl), melting at 137 to 139° C.

EXAMPLE VIII

When 50 parts of lithium manganese pentacarbonyl are reacted with 10 parts of dimethylsilicon difluoride in 550 parts of hexane at room temperature for a period of a half hour, dimethylsilicon bis(manganese pentacarbonyl) is obtained.

EXAMPLE IX

Sodium manganese pentacarbonyl and tri-n-octylsilicon bromide in the proportion of 25 parts of the former to 45 parts of the latter are dissolved in 650 parts of petroleum naphtha and are reacted at room temperature for 2 hours. The product is tri-n-octylsilicon manangese pentacarbonyl.

EXAMPLE X

Lithium manganese pentacarbonyl (25 parts) and tri-2,4-xylylsilicon fluoride (36 parts) are dissolved in 600 parts of ethanol. The mixture is stirred for 90 minutes at room temperature. The product is tri-2,4-xylylsilicon manganese pentacarbonyl.

EXAMPLE XI 50 parts of sodium rhenium pentacarbonyl and 28 parts of dibenzylsilicon dichloride, dissolved in 700 parts of octane, are stirred for 2 hours at room temperature. The product is dibenzylsilicon bis(rhenium pentacarbonyl).

EXAMPLE XII

A mixture of 50 parts of lithium manganese pentacarbonyl and 70 parts of bis(n-dodecylcyclopentadienyl)-germanium dibromide is dissolved in 1150 parts of toluene and stirred for 3 hours at room temperature. The product is bis(n-dodecylcyclopentadienyl)germanium bis(manganese pentacarbonyl).

EXAMPLE XIII

To 25 parts of sodium manganese pentacarbonyl, 47 parts of tris(diethylcyclopentadienyl)germanium chloride are added and the mixture is dissolved in 700 parts of methanol. The solution is stirred for a period of 2 hours at room temperature. Tris(diethylcyclopentadienyl)germanium manganese pentacarbonyl is obtained.

EXAMPLE XIV

Lithium manganese pentacarbonyl, tributylgermanium bromide and diethylether are combined in the ratio 25:32:550. The mixture is reacted at room temperature for a period of 2 hours. The product is tri-n-butylgermanium manganese pentacarbonyl.

EXAMPLE XV

Sodium rhenium pentacarbonyl (50 parts) and dioctadecylgermanium diiodide (83 parts) are dissolved in 1250 parts of petroleum naphtha. The mixture is stirred for 3 hours at room temperature. Bis-octadecylgermanium bis (rhenium pentacarbonyl) is obtained.

EXAMPLE XVI

When 50 parts of lithium manganese pentacarbonyl and 40 parts of bis(ethylphenyl)tin dichloride are mixed with 850 parts of ethanol and the mixture is heated under reflux for a period of 2 hours, bis(ethylphenyl)tin bis(manganese pentacarbonyl) is obtained.

EXAMPLE XVII

To 25 parts of sodium manganese pentacarbonyl, 48 parts of tris(ethylcyclopentadienyl)tin iodide is added and the mixture is dissolved in 700 parts of octane. The resulting mixture is heated to 80° C. for 2 hours. The product is tris(ethylcyclopentadienyl)tin manganese pentacarbonyl.

EXAMPLE XVIII 25 parts of lithium rhenium pentacarbonyl is added to 43 parts of tris(dimethylcyclopentadienyl)tin chloride and the mixture is treated with 650 parts of toluene. Reaction for 2 hours at room temperature results in the formation of tris(dimethylcyclopentadienyl)tin rhenium pentacarbonyl.

EXAMPLE XIX

Methanol solutions of 50 parts of sodium rhenium pentacarbonyl and 43 parts of bis(ethylpropylcyclopentadienyl)tin difluoride are mixed and the mixture is dissolved in 850 parts of methanol. The product is bis(ethylpropylcyclopentadienyl)tin bis(rhenium pentacarbonyl).

EXAMPLE XX 25 parts of potassium rhenium pentacarbonyl are reacted with a mixture of 29 parts of triethyltin bromide and 500 parts of methylene chloride. The mixture is heated to 40° C. and maintained at that temperature for 90 minutes. Triethyltin rhenium pentacarbonyl is obtained.

EXAMPLE XXI

A mixture of 50 parts of lithium manganese pentacarbonyl, 80 parts of didodecyllead diiodide and 600 parts of tetrahydrofuran is heated to reflux for a period of 2½ hours. Didodecyllead bis(manganese pentacarbonyl) is obtained.

EXAMPLE XXII

A mixture of 25 parts of sodium manganese pentacarbonyl, 50 parts of tri-o-tolyllead fluoride and 700 parts of hexane is heated to reflux for a period of 2 hours. The product is tri-o-tolyllead manganese pentacarbonyl.

EXAMPLE XXIII 50 parts of cesium rhenium pentacarbonyl are added to a mixture of 61 parts of bis(acetylcyclohexyl)lead dibromide with 1050 parts of octane and the mixture is stirred at room temperature for 2 hours. The product is bis(acetylcyclohexyl)lead bis(rhenium pentacarbonyl).

EXAMPLE XXIV 25 parts of lithium rhenium pentacarbonyl is dissolved in 700 parts of tetrahydrofuran and the solution is mixed with 120 parts of tris(octadecylcyclopentyl)lead chloride. The mixture is reacted for 4 hours at room temperature. The product is tris(octadecylcyclopentyl)lead rhenium pentacarbonyl.

As stated above, the compounds of this invention are extremely useful as antiknock agents for internal combustion engine fuels. Their really extraordinary effectiveness is best demonstrated by comparison with manganese pentacarbonyl, another excellent antiknock agent. For example, tests have shown that trimethyllead manganese pentacarbonyl is more than 9 times as effective as manganese carbonyl in raising the octane number of leaded fuels. In these tests, manganese pentacarbonyl and trimethyllead manganese pentacarbonyl were separately added to a gasoline blend containing approximately three cubic centimeters of tetraethyllead per gallon as a commercial antiknock fluid composed of tetraethyllead, 0.5 theory of bromine as ethylene dibromide and 1.0 theory of chlorine as ethylene dichloride. (In this regard, one theory is defined as that amount of halide required to supply two atoms of halogen per atom of lead in the tetraethyllead.) These blends were knock-tested using ASTM test procedure D-908. The resulting research octane numbers (ON) are given in the following table.

Table.—Relative Antiknock Potency of Manganese Compounds

| Blend | Mn Additive | Mn conc., g./gal. | Antiknock Rating | | ON Increase Per Unit Weight of Mn |
|---|---|---|---|---|---|
| | | | ON | ON Increase | |
| 1 | None | 0 | 88.2 | | |
| 2 | Manganese pentacarbonyl | 0.52 | 97.6 | 9.4 | 18.1 |
| 3 | Trimethyllead manganese pentacarbonyl | 0.06 | 98.5 | 10.3 | 171.5 |

These results show that as little as 0.06 gram of manganese per gallon as trimethyllead manganese pentacarbonyl produced a greater antiknock-increasing effect than 0.52 gram of manganese per gallon as manganese pentacarbonyl. As the last column of the table clearly shows, trimethyllead manganese pentacarbonyl was almost ten times as effective an antiknock agent as manganese pentacarbonyl.

The following specific examples serve to illustrate further the antiknock effectiveness of the compounds of this invention.

EXAMPLE XXV

To a standard base fuel consisting of toluene 20%, isooctane 15%, diisobutylene 10%, n-heptane 17%, aviation alkylate 30% and n-butane 8% by volume and having a research octane number, clear, of approximately 90, were added various amounts of trimethyllead manganese pentacarbonyl. The resulting research octane numbers are tabulated below.

Grams of manganese per gallon: Gain in octane number
```
0 _____ ___
0.25 _____ 1.5
0.5 _____ 2.9
1.0 _____ 5.7
2.0 _____ 9.2
```

EXAMPLE XXVI

A similar test was carried out using triethyllead manganese pentacarbonyl as the antiknock agent in a fuel identical with that of the preceding example. The results are tabulated below.

Grams of manganese per gallon: Gain in octane number
```
0_____ ___
0.25_____ 2.0
0.5_____ 3.6
1.0_____ 6.3
2.0_____ 9.9
```

EXAMPLE XXVII

With a test fuel composed of toluene (40% by volume), isooctane (10%), diisobutylene (20%) and n-heptane (30%) and containing 3.0 milliliters of tetraethyllead per gallon were blended different amounts of trimethyllead manganese pentacarbonyl ranging from a fraction of a gram up to 2 grams of manganese per gallon. The octane ratings were sharply increased in each instance.

EXAMPLE XXVIII

When triethyllead manganese pentacarbonyl was added to the leaded base fuel of Example XXVII, the following octane ratings were obtained.

Grams of manganese per gallon: Gain in Octane number
```
0 _____ ___
0.1 _____ 0.7
1.0 _____ 1.3
```

EXAMPLE XXIX

When diethyllead bis(manganese pentacarbonyl) was used as the additives in the leaded base fuel of Example XXVII at a concentration corresponding to 0.2 gram of manganese per gallon, it was found that the octane number of the resultant fuel was increased by over one research octane number.

EXAMPLE XXX

To a commercial base stock consisting of 53 volume percent of straight-run gasoline and 47 volume percent of catalytically cracked gasoline are added: 323.5 parts of tetraethyllead (enough to give a lead concentration of 3.0 grams per gallon), 59.4 parts of ethylene dichloride (0.60 theory), 122.1 parts of ethylene dibromide (0.65 theory) and 0.2 gram of manganese per gallon as dimethyllead bis(manganese pentacarbonyl). The resultant gasoline has a markedly higher antiknock value than the same gasoline without the manganese compound.

EXAMPLE XXXI

The commercial base stock of Example XXX is leaded with 2.0 grams per gallon (267.4 parts) of tetramethyllead, and 99 parts (1.0 theory) of the ethylene dichloride and 129.6 parts (0.6 theory) of 2,3-dibromobutane are added. 0.6 gram of manganese per gallon as triphenyltin manganese pentacarbonyl is blended with the above fuel. The addition of the manganese compound results in a significant rise in antiknock rating.

EXAMPLE XXXII

A base stock is prepared by mixing 24 volumes of isopentane, 66 volumes of isooctane and 10 volumes of cumene. To this base stock is added 0.75 grams of lead per gallon as a mixture (296.0 parts) containing 5.5% of tetramethyllead, 24% of trimethylethyllead, 37.5% of dimethyldiethyllead, 26% methyltriethyllead and 7% of tetraethyllead. To the resulting mixture are added 79.1 parts (0.70 theory) of 1,2-dichloropropane and 145.6 parts (0.775 theory) of ethylene dibromide. Finally, 0.075 gram of manganese per gallon as diphenyltin bis(manganese pentacarbonyl) is added. A significant increase in knock rating accompanies the final adidtion.

EXAMPLE XXXIII

When the base stock of Example XXXII is treated with 1.2 parts of manganese per gallon as triphenyllead manganese pentacarbonyl, an increase in knock rating is observed.

EXAMPLE XXXIV

A tetraethyllead fluid is prepared by mixing 323.5 parts of tetraethyllead with 144.8 parts (0.60 theory) of n-hexyl chloride and 156.2 parts (0.625 theory) of mixed dibromotoluenes. The resulting fluid is mixed with a sufficient amount of a base fuel consisting of 15% by volume of alkylate gasoline and 85% of catalytically cracked gasoline to give a lead concentration of 1.25 grams of lead per gallon. The addition to this blended fuel of 0.16 gram of manganese per gallon as triethyltin manganese pentacarbonyl increases the antiknock value thereof.

EXAMPLE XXXV 267.4 parts of tetramethyllead, 59.4 parts (0.60 theory) of ethylene dichloride and 122.1 parts (0.65 theory) of ethylene dibromide are blended with the base fuel of Example XXXIV in an amount sufficient to give a lead concentration of 2.50 grams per gallon. When 0.4 gram of manganese as tris(methylcyclopentadienyl)tin manganese pentacarbonyl is added, a rise in the knock rating of the blended fuel is observed.

EXAMPLE XXXVI

A base stock is prepared by blending 15 volume percent of an alkylate with 85 percent of a straight-run gasoline. With this base stock is mixed 1.0 gram of lead per gallon as a fluid containing dimethyldiethyllead 295.5 parts, 1,2-dichloropropane 113.0 parts (1.0 theory) and ethylene dibromide 122.1 parts (0.65 theory). 0.8 gram of manganese per gallon as di-o-tolyllead bis(manganese pentacarbonyl) is added to the leaded fuel resulting from the above treatment, which addition produces a significant increase in knock rating.

EXAMPLE XXXVII

When the bast stock of Example XXXVI is treated with 0.4 part of manganese per gallon as didodecyltin bis(manganese pentacarbonyl), the antiknock effectiveness of the fuel is improved.

EXAMPLE XXXVIII

A leaded gasoline is prepared as follows: 323.5 parts of tetraethyllead, 90.4 parts (0.80 theory) of 1,2-dichloropropane, and 181.5 parts (0.75 theory) of 1,2-dibromocyclohexane are blended with a base stock consisting of 15 volume percent of alkylate and 85 percent of thermally cracked gasoline, in such proportions as to produce a fuel containing 6.0 grams of lead per gallon. The addition of 0.5 gram of manganese per gallon as tris(diethylcyclopentadienyl)germanium manganese pentacarbonyl produces an increase in the antiknock effectiveness of the leaded gasoline.

EXAMPLE XXXIX

To the base stock of Example XXXVIII are added 2.8 grams of lead per gallon as tetramethyllead (267.4 parts) and 187.8 parts (1.00 theory) of ethylene dibromide. The knock rating of this leaded fuel is increased by the addition thereto of 0.3 gram of manganese per gallon as trioctylsilicon manganese pentacarbonyl.

In addition to their effects in increasing the octane ratings of internal combustion engine fuels, the compounds of this invention are effective antiwear agents in lubricants. To demonstrate this antiwear activity, recourse may be had to test methods involving, for example, the use of the four-ball wear machine described by Larsen and Perry in the "Transactions of the ASME," January 1945, pages 45–50.

The following examples serve to illustrate the antiwear effectiveness of the compounds of this invention. All percentages given in these examples are by weight.

EXAMPLE XL

A Mid-Continent solvent-extracted mineral oil not containing an additive of the invention is run in the four-ball wear machine using ½-inch SAE 52–100 steel balls, a speed of 570 r.p.m. for 2 hours, and a load of 10 kilograms. Following the test, the ball are disassembled and the average scar diameter on the lower three balls is measured. The test is then repeated with the addition to the mineral oil of 2% by weight of dimethyltin bis(manganese pentacarbonyl). The average scar diameter in the second case is less than half that in the first.

EXAMPLE XLI

To the Mid-Continent oil of Example XL is added 1.5% of triphenyltin manganese pentacarbonyl. This addition results in a marked diminution in wear as tested by the four-ball wear machine.

EXAMPLE XLII

The addition of 2.0% of dimethyllead bis(manganese pentacarbonyl) to a polybutene oil greatly reduces the wear produced thereby.

EXAMPLE XLIII

When 1.0% of triphenyllead manganese pentacarbonyl is added to a lubricant consisting of di-2-ethylhexyl sebacate a large reduction occurs in the wear produced by the diester oil.

EXAMPLE XLIV

A di-isooctyl adipate lubricant, when treated with 0.5% of diethyllead bis(manganese pentacarbonyl), exhibits greatly reduced wear.

EXAMPLE XLV 0.25 percent of diphenyltin bis(manganese pentacarbonyl), when added to a diester lubricant consisting of dibutoxyethyl phthalate, causes a very large wear reduction.

EXAMPLE VLVI

When 0.75% of dimethylsilicon bis(manganese pentacarbonyl) is added to a pentaerythritol tetracaproate lubricant and the mixture subjected to the four-ball wear test, a considerable reduction in wear is found as compared with the base oil.

EXAMPLE XLVII

The addition of 2.0% of triethyltin manganese pentacarbonyl to a dimethyl polysiloxane oil increases the lubricity thereof and greatly reduces its wear characteristics.

EXAMPLE XLVIII

A methylvinyl polysiloxane lubricant, treated with 1.5% of tributylgermanium manganese pentacarbonyl, shows increased lubricity and reduced wear producing tendencies.

EXAMPLE XLIX

The addition of 0.75% of tris(methylcyclopentadienyl)tin manganese pentacarbonyl to an oil consisting of di-p-chlorophenyl polysiloxane greatly diminishes the wear characteristics thereof.

EXAMPLE L

To a lubricant consisting of di-(m-trifluoromethylphenyl)polysiloxane, 1.0% of didodecyllead bis(manganese pentacarbonyl) is added, which addition results in a major reduction in the wear observed with this lubricant.

The above examples show clearly that the use of the compounds of this invention as lubricant additives produces striking reductions in wear.

As indicated above, a wide variety of organo-bimetallic compounds falls within the scope of this invention. Examples of these compounds are the following: diphenyllead bis(manganese pentacarbonyl), methylphenyllead bis(manganese pentacarbonyl), methylethyllead bis(manganese pentacarbonyl), ethylphenyllead bis(manganese pentacarbonyl), methyldiethyllead manganese pentacarbonyl, dimethylethyllead manganese pentacarbonyl, methyldiphenyllead manganese pentacarbonyl, dimethylphenyllead rhenium pentacarbonyl, methylethyltin bis(manganese pentacarbonyl), methylphenyltin bis(manganese pentacarbonyl), ethylphenyltin bis(manganese pentacarbonyl), trimethyltin manganese pentacarbonyl, methyldiethyltin manganese pentacarbonyl, dimethylethyltin rhenium pentacarbonyl, triphenyltin manganese pentacarbonyl, methyldiphenyltin manganese pentacarbonyl, dimethylphenyltin manganese pentacarbonyl, methylethylphenyltin manganese pentacarbonyl, dimethylgermanium bis(manganese pentacarbonyl), diethylgermanium bis(rhenium pentacarbonyl), methylethylgermanium bis(manganese pentacarbonyl), di-n-propylgermanium bis(manganese pentacarbonyl), diphenylgermanium bis(manganese pentacarbonyl), methylphenylgermanium bis(manganese pentacarbonyl), trimethylgermanium manganese pentacarbonyl, dimethylethylgermanium manganese pentacarbonyl, methyldiethylgermanium manganese pentacarbonyl, triethylgermanium manganese pentacarbonyl, tri-n-butylgermanium manganese pentacarbonyl, triphenylgermanium rhenium pentacarbonyl, methyldiphenylgermanium manganese pentacarbonyl, dimethylphenylgermanium manganese pentacarbonyl, dimethylsilicon bis(rhenium pentacarbonyl), methylethylsilicon bis(manganese pentacarbonyl), di-n-butylsilicon bis(manganese pentacarbonyl), diphenylsilicon bis(manganese pentacarbonyl), methylphenylsilicon bis(manganese pentacarbonyl), trimethylsilicon manganese pentacarbonyl, triethylsilicon manganese pentacarbonyl, tri-n-propylsilicon manganese pentacarbonyl, triphenylsilicon manganese pentacarbonyl, methyldiphenylsilicon manganese pentacarbonyl and dimethylphenylsilicon rhenium pentacarbonyl. However, preferred compounds include trimethyllead manganese pentacarbonyl, dimethyllead bis(manganese pentacarbonyl), triethyllead manganese pentacarbonyl, diethyllead bis(manganese pentacarbonyl), triphenyllead manganese pentacarbonyl, dimethyltin bis(manganese pentacarbonyl), triphenyltin manganese pentacarbonyl and diphenyltin bis(manganese pentacarbonyl). These are preferred because of their ease of preparation and because of their high effectiveness as antiknock and antiwear agents.

In making the valuable compounds of this invention, a wide variety of reactants are available. The alkali metal manganese (or other VII–B metal) pentacarbonyl is made by the reaction of manganese (or other VII–B metal) pentacarbonyl dimer with an excess of alkali metal in the form of its amalgam. The reaction is carried out in tetrahydrofuran or other suitable solvent. The mixture is stirred at room temperature until reaction is essentially complete. The mercury is then separated and the reaction mixture is used without further treatment for the reaction of the invention. Illustrative of these compounds are sodium manganese pentacarbonyl, potassium rhenium pentacarbonyl, lithium rhenium pentacarbonyl, rubidium manganese pentacarbonyl and cesium manganese pentacarbonyl.

Methods for the preparation of organo metal halides—the other reactants in the process of this invention—are described by E. Krause and A. von Grosse in "Die Chemie der Metallorganischen Verbindungen," Borntraeger, Berlin, 1937. Examples of such compounds include triphenyltin chloride, dimethyltin dichloride, triphenyllead chloride, diethyllead dichloride, dimethylsilicon difluoride, tris(ethylcyclopentadienyl)silicon iodide, bis(dodecylcyclopentadienyl)germanium dibromide, bis(ethylphenyl)tin dichloride and bis(acetylcyclohexyl)lead dibromide.

The reactants—$M^1[M^7(CO)_5]$ and $R_mM^4X_{4-m}$—used in the preparation of the compounds of this invention can be employed in proportions ranging from a 100 percent or greater excess of the group VII–B compound to a 100 percent or greater excess of the group IV–A halide compound. Usually, they are employed in proportions corresponding approximately to stoichiometric equivalence, but a moderate excess of one reactant or the other is often used to bring about an increased reaction rate.

The solvents employed in the reactions of this invention may include aromatic hydrocarbons such as benzene, toluene, the xylenes and the like, aliphatic hydrocarbons such as hexanes, heptanes, octanes, petroleum naphtha and the like, aliphatic or aromatic ethers such as diethylether, diethyleneglycol diethyl ether, diethyleneglycol dibutyl ether or tetrahydrofuran, aliphatic alcohols such as methanol, ethanol, isopropanol, the pentanols, etc., and halohydrocarbons such as methylene chloride and carbon tetrachloride. The preferred solvent is tetrahydrofuran because of its relatively high solubility for the reactants, and for the other reasons mentioned above.

The reaction of this invention may be carried out at any temperature within the liquid range of the solvent. Room temperature is perfectly satisfactory in most instances and care should be taken not to employ too high a temperature for too long a time inasmuch as temperatures approaching the reflux temperatures of the solvents may cause more or less extensive decomposition of the products.

Because the reaction usually proceeds rapidly under normal conditions of temperature and pressure, atmospheric pressure is usually satisfactory but pressures ranging from 10 millimeters of mercury to 100 atmospheres may be used if desired.

The reaction of this invention may be carried out under any atmosphere inert to both reactants and products. The lead and tin compounds are stable on exposure to dry air, which can thus be used with safety. The use of dry nitrogen is preferred for the less stable germanium and silicon compounds. Other suitable protective atmospheres include helium, neon, argon, krypton and xenon.

The normally solid compounds of this invention are soluble in and can be purified by recrystallization from a variety of organic solvents. Specifically, simple aromatic solvents such as benzene or toluene, simple aliphatic solvents such as hexane, alcohols such as ethanol, and halohydrocarbons such as methylene chloride, and their mixtures, are found to be satisfactory.

In the improved fuels of this invention, organic halide scavengers can be employed. These scavengers can be either aliphatic or aromatic halohydrocarbons or a combination of the two having halogen attached to carbon in either the aliphatic or aromatic portion of the molecule. These scavengers may also be carbon-, hydrogen- and oxygen-containing compounds, such as haloalkyl ethers, halohydrins, halonitro compounds, and the like. Still other examples of scavengers that may be used in this invention are illustrated in U.S. Patents 1,592,954; 1,668,022; 2,398,281; 2,479,900; 2,479,901, 2,479,902; 2,479,903; 2,496,983; 2,661,379; 2,822,252; 2,849,320; 2,849,303 and 2,849,304. Mixtures of different scavengers may also be used. Concentrations of organic halide scavengers ranging from about 0.2 to about 2.5 theories based on the lead are usually sufficient although greater or lesser amounts may be used. Thus, in general, use is made of an amount of organic halide scavenger that is capable of reacting with the lead during engine combustion to form relatively volatile lead halide and thereby effectively control the amount of deposits formed in the engine.

The fuels of this invention can contain other additives. Typical of these are antioxidants (e.g., N,N'-di-sec-butyl-p-phenylenediamine; p-N-butylamino phenol; 4-methyl-2,6-di-tert-butyl phenol; 2,6-di-tert-butyl phenol; etc.), metal deactivators (e.g., N,N'-disalcylidene-1,2-diaminopropane, etc.), dyes, phosphorus additives (e.g., tri-(β-chloropropyl) thionophosphate, dimethyltolylphosphate, dimethylxylylphosphate, phenyldimethylphosphate, tricresylphosphate, phenyldicresylphosphate, cresyldiphenylphosphate, trimethylphosphate, etc.), boron additives, corrosion inhibitors, detergents, anti-icing additives, other antiknock agents (e.g., methylcyclopentadienyl manganese tricarbonyl, cyclopentadienyl manganese tricarbonyl, cyclopentadienyl nickel nitrosyl, manganese pentacarbonyl, iron carbonyl, dicyclopentadienyl iron, etc.), induction system cleanliness additives, top-cylinder lubricants, and the like.

I claim:
1. A compound represented by the general formula

$$R_nM^4[M^7(CO)_5]_{4-n}$$

wherein R is a radical selected from the group consisting of alkyl, aryl, cycloalkyl, aralkyl and alkaryl radicals containing from 1 to about 18 carbon atoms, $M^4$ is an element of group IV-A of the periodic system having an atomic number from 14 to 82, inclusive, $M^7$ is an element of group VII-B of the periodic system having an atomic number from 25 to 75, inclusive, and $n$ is an integer from 2 to 3, inclusive.

2. The compound of claim 1, wherein $M^7$ is manganese.
3. The compound of claim 1, wherein $M^4$ is lead and $M^7$ is manganese.
4. The compound of claim 1, wherein $M^4$ is tin and $M^7$ is manganese.
5. Trimethyllead manganese pentacarbonyl.
6. Dimethyllead bis(manganese pentacarbonyl).
7. Triethyllead manganese pentacarbonyl.
8. Diethyllead bis(manganese pentacarbonyl).
9. Triphenyllead manganese pentacarbonyl.
10. Dimethyltin bis(manganese pentacarbonyl).
11. Triphenyltin manganese pentacarbonyl.
12. Diphenyltin bis(manganese pentacarbonyl).
13. The method of preparing a compound represented by the general formula $$R_nM^4[M^7(CO)_5]_{4-n}$$

wherein R is a radical selected from the group consisting of alkyl, aryl, cycloalkyl, aralkyl and alkaryl radicals containing from 1 to about 18 carbon atoms, $M^4$ is an element of group IV-A of the periodic system having an atomic number from 14 to 82, inclusive, $M^7$ is an element of group VII-B of the periodic system having an atomic number from 25 to 75, inclusive, and $n$ is an integer from 2 to 3, inclusive, which comprises reacting a compound represented by the general formula $$M^1[M^7(CO)_5]$$

wherein $M^1$ is an element selected from group I-A of the periodic system having an atomic number from 3 to 87, inclusive with a compound represented by the general formula $$R_nM^4X_{4-n}$$

wherein X is a halogen.
14. The method of claim 13, wherein $M^1$ is sodium and X is chlorine.
15. The method of claim 13, wherein $M^7$ is manganese.
16. The method of claim 13, wherein $M^7$ is manganese and $M^4$ is tin.
17. The method of claim 13, wherein $M^7$ is manganese and $M^4$ is lead.
18. The method of claim 13, wherein the reaction is carried out in an inert organic solvent.
19. The method of claim 13, wherein the reaction is carried out in an ether as solvent.
20. The method of claim 13, wherein the reaction is carried out in tetrahydrofuran as solvent.

References Cited in the file of this patent

UNITED STATES PATENTS

| | | |
|---|---|---|
| 2,870,180 | Kozikowski et al. | Jan. 20, 1959 |
| 2,881,062 | Bishop | Apr. 7, 1959 |
| 2,884,314 | Smith | Apr. 28, 1959 |
| 2,898,354 | Shapiro et al. | Aug. 4, 1959 |

OTHER REFERENCES

King et al.: J.A.C.S. 82, No. 15, pages 3833–3855, August 5, 1960.